May 23, 1933.  L. LOMANDO  1,910,804
CHAIN LINK AND CONVEYER FORMED THEREFROM
Filed Feb. 25, 1929   3 Sheets-Sheet 1
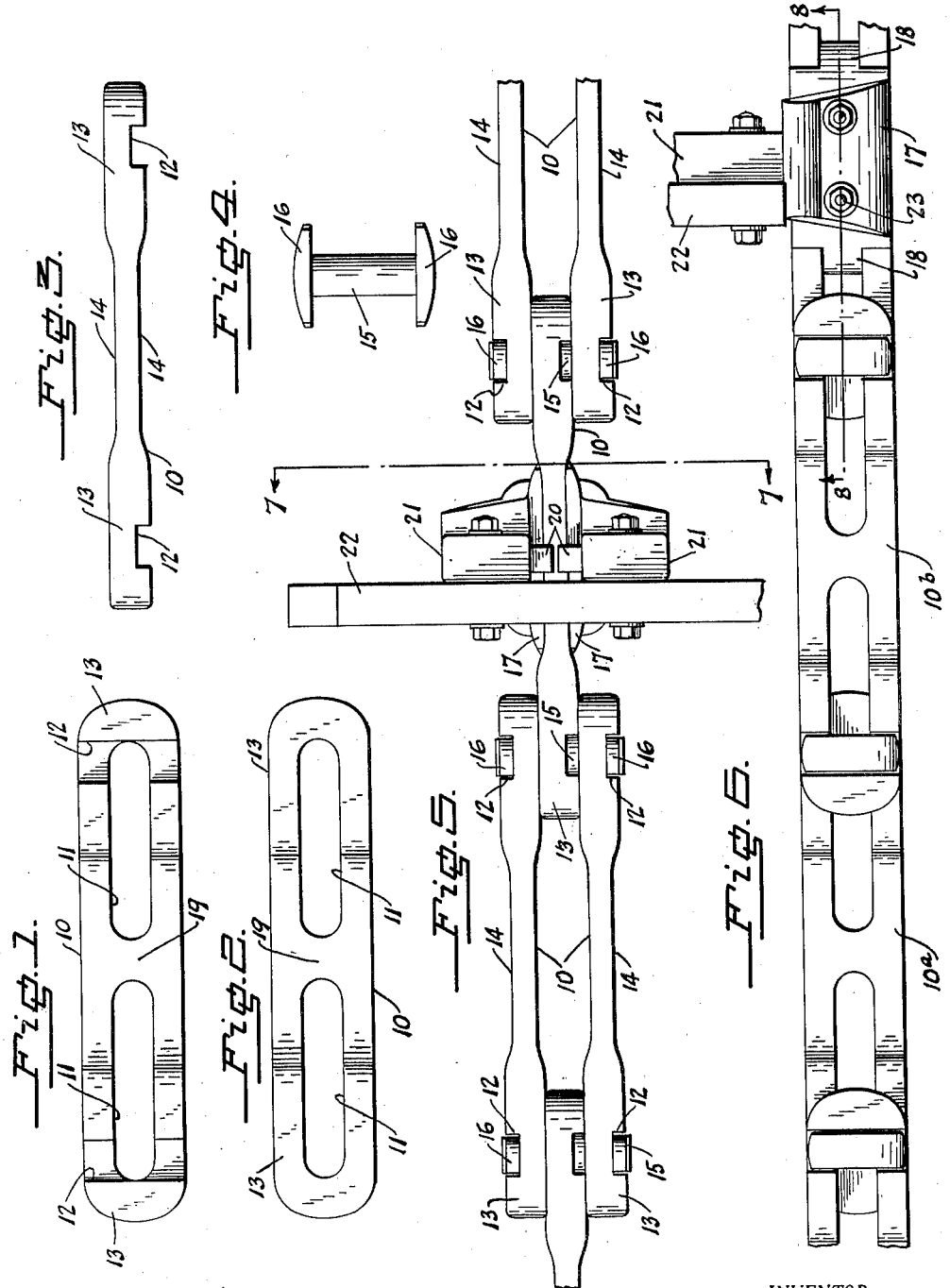
WITNESSES
Evelyn Crompton
Anna M. Ward
INVENTOR
Lewis Lomando
BY
Joshua R. H. Potts
ATTORNEY

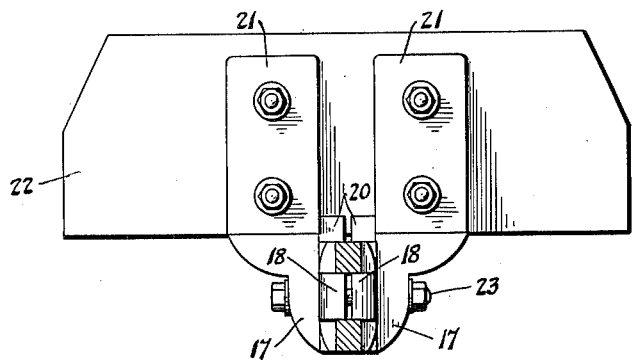
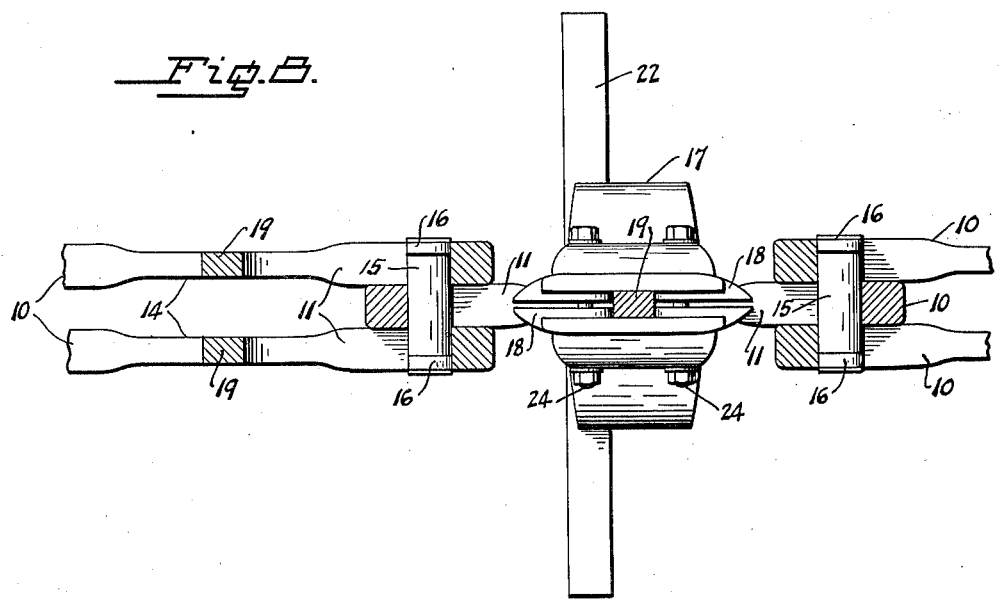

May 23, 1933.  L. LOMANDO  1,910,804
CHAIN LINK AND CONVEYER FORMED THEREFROM
Filed Feb. 25, 1929   3 Sheets-Sheet 3
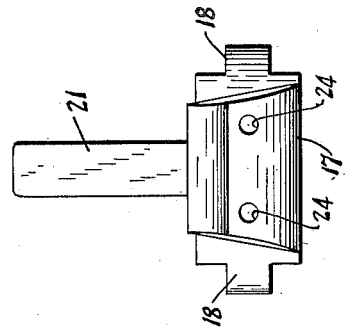
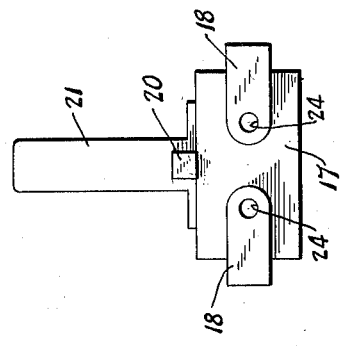
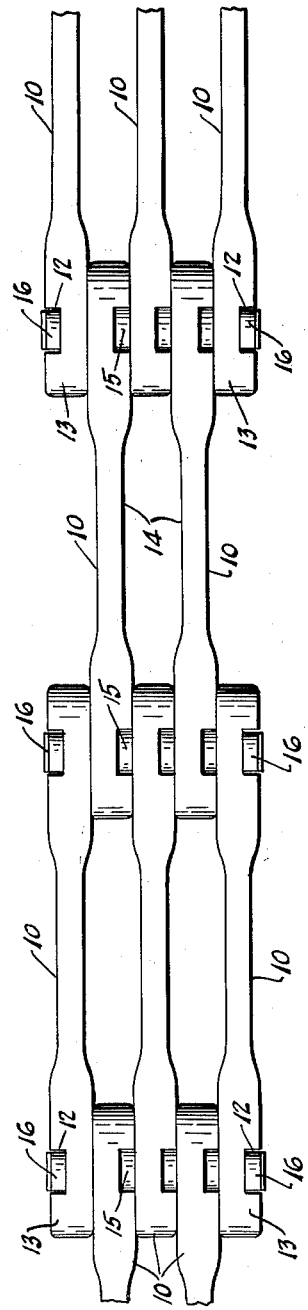
WITNESSES
Evelyn Crompton
Anna M. Ward
INVENTOR
Lewis Lomando
BY
Joshua R. H. Potts
ATTORNEY Patented May 23, 1933

1,910,804

UNITED STATES PATENT OFFICE

LEWIS LOMANDO, OF HAZLETON, PENNSYLVANIA

CHAIN LINK AND CONVEYER FORMED THEREFROM

Application filed February 25, 1929. Serial No. 342,633.

The present invention relates to chain links and to the assembly thereof in a chain; the invention having especial application to use as conveyer chains with flights attached thereto.

Objects of the invention are to improve the construction of links of this character and their assembly into chains.

A further object is to provide a chain of the above character all the links of which are alike.

A still further object is to provide a chain, the links of which are connected by pins in a manner such that the links may be separated by simple manipulation thereof and of the connecting pins.

An additional object is to provide a chain adapted as a conveyer and in which the conveying units function to prevent accidental disconnection of the links.

A fifth object is to provide an improved connection between the conveying unit and the chain.

The invention consists of a chain, the links of which are connected by pins; all the links may be alike having elongated slots longitudinally thereof and thickened ends with intervening lateral concavities, said links being connected by pins having heads which may be elongated in one direction and of dimensions to pass through the slots when turned to parallelism therewith. The thickened ends of the links may also be provided with a grooved seating for the heads of the pins, said seating extending transversely of the ends of the slots and the chain may have conveyer units connected therewith in a manner to prevent disconnection of the links one from the other and so as to secure the conveyer means to the chain against relative shift of position. To this end, the slots in the links may be crossed intermediate of the ends of the link by cross members and the conveyer supporting units may be provided with flanges snugly fitting both sides of this member.

For a more complete understanding of the invention reference may be had to the accompanying drawings, in which, Figure 1 is a side elevation of a link made in accordance with my invention and showing the slots in the link and their relation to the transverse grooves.

Figure 2 is a similar elevation showing the opposite side of the link.

Figure 3 is an edge view of the link, showing clearly the relation of the central concavities between the thickened ends of the link.

Figure 4 is a detail view showing the connecting pins for assembling the links in a chain.

Figure 5 shows one mode of assembling the links in a chain and the connection of a conveyer flight thereto.

Figure 6 is a side elevation of a chain shifted longitudinally for purposes of illustration and showing the connection of the flight thereto, a portion of the flight being broken away.

Figure 7 is a section on line 7—7 of Figure 5, further illustrating the connection of the flight to the chain.

Figure 8 is a section on the line 8—8 of Figure 6, showing this connection through a different angle.

Figure 9 is a detail view of one of the flight supporting brackets showing the connecting lugs and flanges thereon.

Figure 10 is a similar view showing the bracket from the reverse side.

Figure 11 illustrates a further application of the links and pins in a chain.

The construction as herein illustrated lends itself to a cheapening of the production of chains of this character and the construction of the links makes it possible to use the same interchangeably and to provide a chain made up of links identical in construction.

Referring first to Figures 1, 2 and 3 which illustrate the details of the link itself, it will be noted that the link is an elongated member which may be designated by the numeral 10 having elongated slots 11 formed therein and transverse grooves 12 communicating with the ends of said slots. These grooves may be located on one side only of the links as shown and may also be located in thickened end portions 13 of the link which provide between them depressions or concavities 14 on both sides of the link.

The combined depth of the two concavities may be slightly greater than the depth of the transverse grooves in order to permit the disengagement of a link from that connected thereto. These links are connected together by pins 15 such as are represented in Figure 4 of the drawings having heads 16 thereon fitting in the depressions or grooves 12. These heads are preferably made to fairly snugly fit the said grooves and in the present showing are elongated so as to extend a sufficient distance across the links to normally prevent disengagement thereof.

When a chain is made up of links and pins of this character, the links may be disconnected by first moving the intermediary link, as the link 10$^a$, in Figure 6 longitudinally with respect to the adjacent link and then turning the same at right angles so that the thickened parts of the two links connected to the link 10$^a$ may drop into the central concavities of said link. When this is done, sufficient play will be afforded to the pin 15 so that one head thereof may be lifted out of the groove and the link 10$^b$ turned at right angles permitting disconnection of the links. The reverse of this operation, of course, will be resorted to in assembling the links. The links so connected will, under ordinary circumstances, not become disengaged one from the other except under very unusual circumstances. However, to prevent such disengagement the location of a member preventing the sliding of links relative to each other in the manner described above may be attached intermediate of the ends of certain of the links. Such a member is provided in a conveyer chain in the connection of the flights or brackets to the chain.

I accomplish the double purpose therefore of preventing the disengagement of the links and the attachment of the flights to the chain in a manner which not only prevents this disengagement but also makes an improved connection of flights of this character.

This is accomplished by providing a bracket member clearly shown in Figures 9 and 10 of the drawings which may be used singly or in pairs for connecting the conveyer flight to the chain. These bracket members are provided with supporting blocks which are adaptd to fit in the cavities or depressions of the links and against the flat sides thereof. These supporting members 17 are provided with flanges 18 spaced apart and of a width to extend into the slots 11 of the links on either side of a cross member 19 provided on the links. A lug 20 is also provided which rests on the outer periphery of the link and affords with the lugs 18 a steadying construction. Extending from these supporting members 17 are the uprights 21 to which the flight 22 may be attached before the links can be disengaged in the manner above. It will be clearly understood that this bracket member must be first removed from the links. The brackets may be used in pairs as shown and the two supporting members 17 connected by bolts 23 extending through apertures 24 in the supporting blocks.

It will be understood that changes and modifications of the links and of the chain itself constituting the subject matter of the present invention, may be made within the scope of the invention as herein before set forth and within the scope of the appended claims.

I claim:—

1. In combination with the link of a chain having alined longitudinal slots therein and a cross member separating said slots, identical brackets secured upon opposite sides of said link, said brackets each having flanges extending into said slots and against both sides of said cross member longitudinally of the link.

2. In combination with a link having an aperture therein, brackets having each a flange extending from opposite sides into said aperture, a lug spaced from said flange and resting on the outer periphery of the link, and a flight connected with said brackets, said brackets being contoured for connection with said flight similarly upon opposite sides.

3. In combination with the link of a chain having alined longitudinal slots therein and a cross member separating said slots, a pair of identical brackets secured upon opposite sides of said link, said brackets each having flanges extending into said slots and against both sides of said cross member longitudinally of the link, said brackets being contoured to form upon both sides similar planes coinciding upon opposite sides of the link, and a flight connected with the selected sides of said brackets.

In testimony whereof I have signed my name to this specification.

LEWIS LOMANDO.